No. 748,103. PATENTED DEC. 29, 1903.
T. F. ROBINSON, C. E. SMETHURST & W. M. GILBERT.
STOP MECHANISM.
APPLICATION FILED SEPT. 19, 1902.
NO MODEL. 5 SHEETS—SHEET 4.

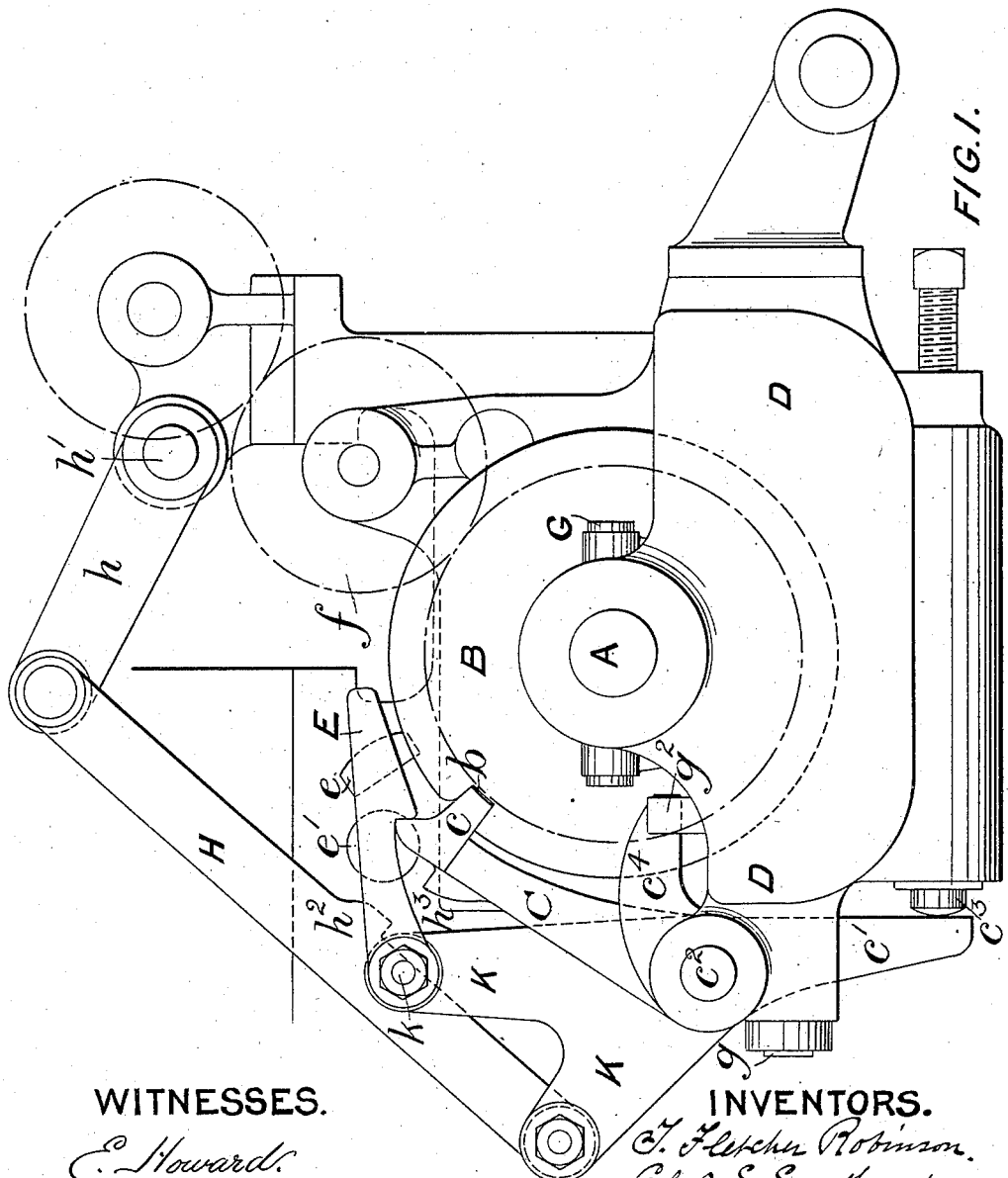

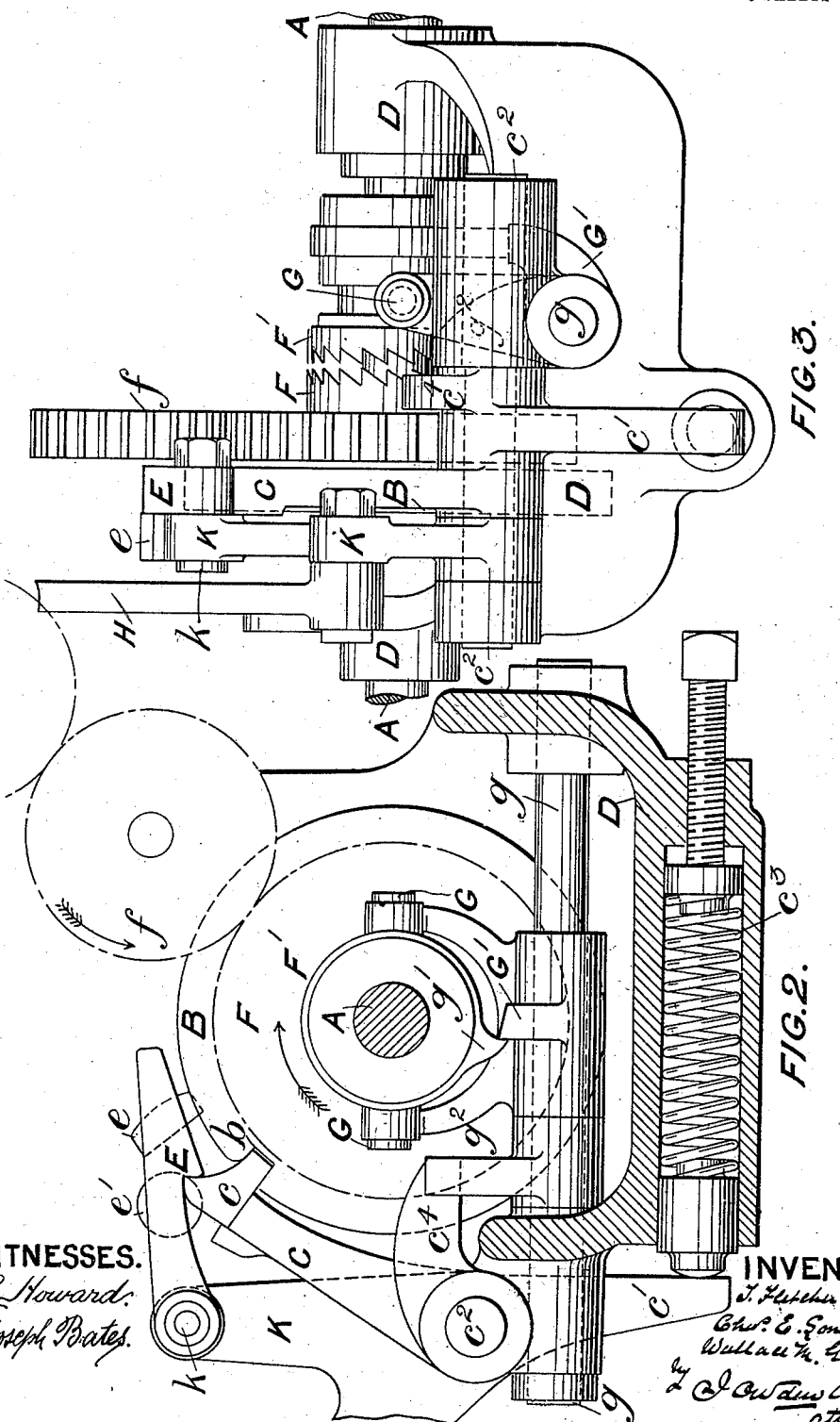

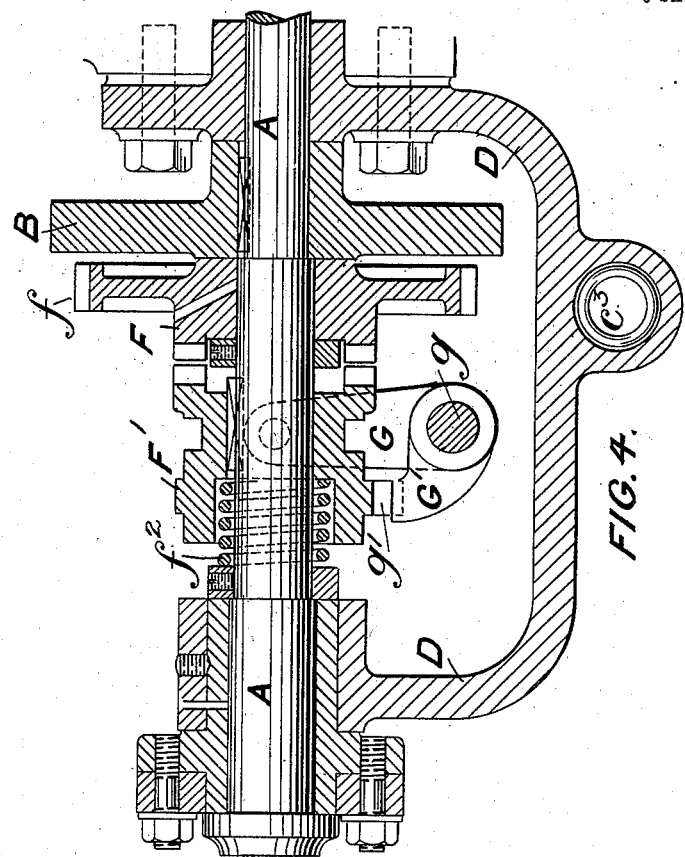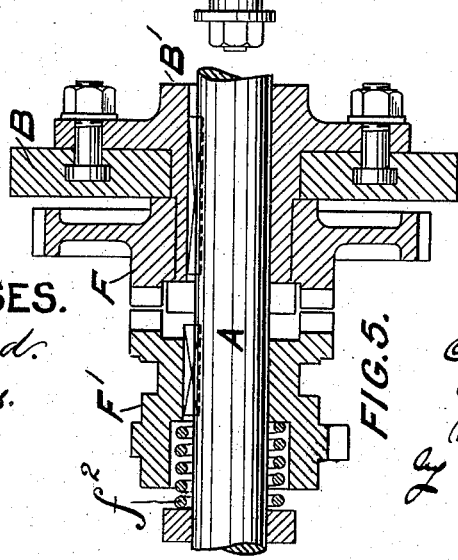

WITNESSES.
E. Howard.
Joseph Bates.

INVENTORS.
T. Fletcher Robinson
Chas. E. Smethurst
Wallace M. Gilbert
by J. Owden O'Brien.
atty No. 748,103. PATENTED DEC. 29, 1903.
T. F. ROBINSON, C. E. SMETHURST & W. M. GILBERT.
STOP MECHANISM.
APPLICATION FILED SEPT. 19, 1902.
NO MODEL. 5 SHEETS—SHEET 5.

WITNESSES.
E. Howard.
Joseph Bates.

INVENTORS.
T. Fletcher Robinson
Chas. E. Smethurst
Wallace M. Gilbert
by Cowaen O'Brien
atty No. 748,103. Patented December 29, 1903.

UNITED STATES PATENT OFFICE.

THOMAS FLETCHER ROBINSON, CHARLES E. SMETHURST, AND WALLACE M. GILBERT, OF SALFORD, ENGLAND; SAID SMETHURST AND GILBERT ASSIGNORS TO SAID ROBINSON.

STOP MECHANISM.

SPECIFICATION forming part of Letters Patent No. 748,103, dated December 29, 1903.

Application filed September 19, 1902. Serial No. 124,040. (No model.)

*To all whom it may concern:*

Be it known that we, THOMAS FLETCHER ROBINSON, CHARLES EDWIN SMETHURST, and WALLACE MARCUS GILBERT, British subjects, and residents of Salford, in the county of Lancaster, England, have invented certain new and useful Improvements in Stop Mechanism, of which the following is a specification.

This invention relates to improvements in dividing mechanism applicable for gear-cutting machines, milling-machines, and other machines wherein it is desired to give a shaft a revolution at intervals and then lock it or hold it immovable until the completion of the cutting or other operation.

It consists, essentially, in applying to the shaft to be operated or rotated a notched disk keyed or otherwise attached thereto, a dividing lever or finger pivoted to a fixed stud which engages with the notch in the disk and locks it in position, a releasing-lever for withdrawing the locking-lever, and a clutch on the shaft by which the shaft is rotated when released.

The invention will be fully described with reference to the accompanying drawings.

Figure 6:
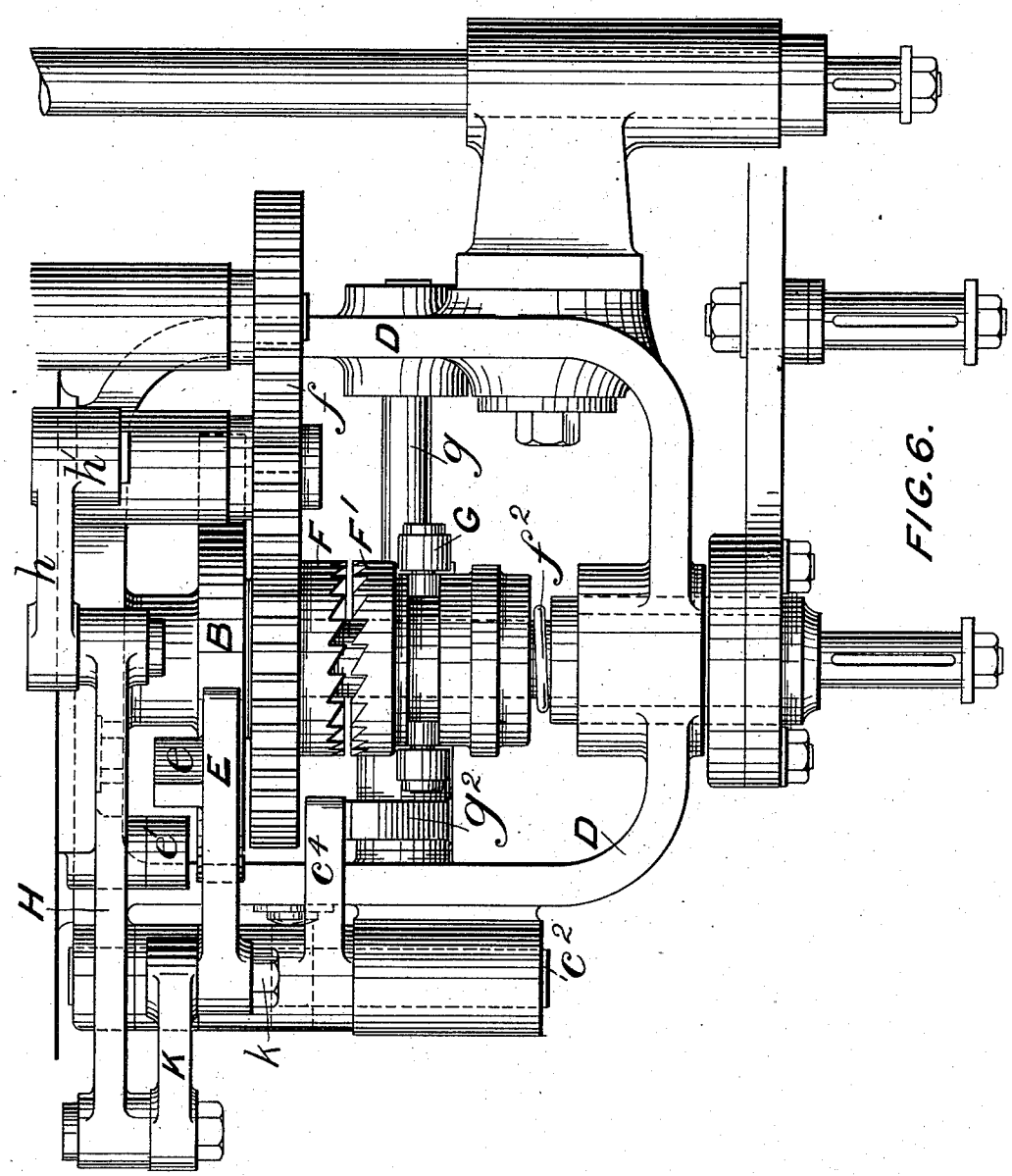
Figure 7:
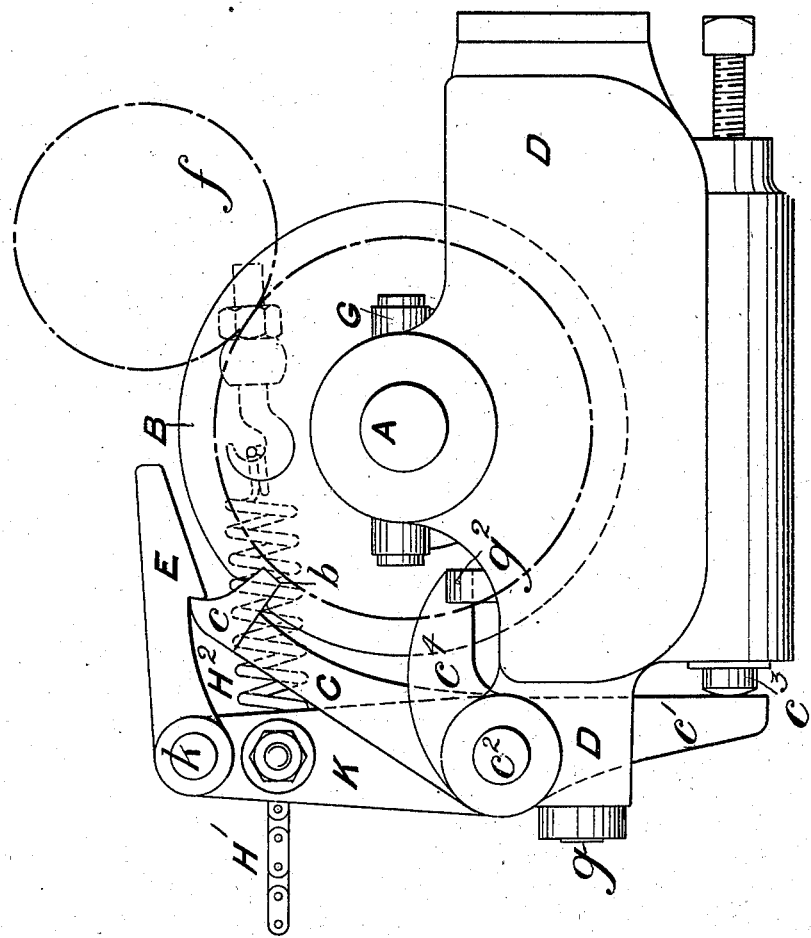

Figure 1 is an end elevation; Fig. 2, a sectional elevation on the broken line, Fig. 4; Fig. 3, a side elevation; Fig. 4, a longitudinal section, (view from the opposite side to Fig. 3;) Fig. 5, a longitudinal section showing a modified arrangement of securing the disk B to the shaft; Fig. 6, a plan; Fig. 7, an end elevation showing a modified arrangement for operating or withdrawing the dividing or locking lever C from the disk B.

The shaft A, to which it is desired to give an exact complete revolution at intervals and then hold it immovably locked during the cutting operation on the work, is connected by a gear-wheel placed at one end (or in other convenient position) and by a secondary shaft with the work-holder of the cutting-machine, and from it the work, such as a toothed wheel, is rotated such part of a revolution as may be required after each cut or traverse of the cutting or operative part of the machine. As such do not form any part of the invention and may be of any known construction, they are not illustrated in the drawings.

On the central shaft A is fitted so as to rotate with it a disk B, with a notch $b$ in its periphery, and engaging with the disk B is a pivoted dividing or locking lever C, with a tooth or projection $c$, which enters the notch $b$ in the periphery of the disk B. This disk B may be keyed to the shaft A, as in Fig. 4, or it may be bolted to a sleeve B', keyed or pinned to the shaft A, as in Fig. 5, or the disk B may be secured to the shaft A, so as to rotate with it, in any other practical manner. The dividing or locking lever C is pivoted upon a stud $c^2$, mounted in the frame D, and is operated or held in contact with the disk B and in the notch $b$ by a strong spring $c^3$ acting against its lower member $c'$.

The dividing and locking lever C is drawn back out of the notch $b$ by a releasing-pawl E, also pivoted upon the stud $c^2$, each time the cutting-tool of the machine to which it is applied has completed its cut or traverse.

On the shaft A there is also fitted a clutch of two members F F', the driving clutch member F being loose on the shaft and driven by a train of gear-wheels $f$ so as to constantly revolve and the driven clutch member F' keyed or spliced to rotate with the shaft A and slide longitudinally upon it to engage or disengage with the revolving or driving member of the clutch. The driven clutch member F' of the clutch is moved into contact with the loose driving member F by the spring $f^2$ and out of contact by the forked lever G.

The forked clutch-lever G is pivoted upon the stud $g$ and is fitted with a second lever or arm G', and the sliding clutch member F' is fitted with a cam $g'$, which at each revolution of the clutch member F' and shaft A engages the arm G' and actuates the forked lever G, throwing the driven member F' of the clutch out of gear with the driving member F.

The forked clutch-lever G is locked or held so as to prevent the movement of the clutch member F' into gear, except when it is required to operate the shaft A, by a short lever $g^2$, connected therewith, which rests against the projection or finger $c^4$ on the base of the dividing and locking lever C.

The releasing-pawl E is drawn back periodically each time the cutting-tool of the machine has completed its return traverse. It is connected to the slide by a connecting-rod H and link or lever $h$, fixed to a spindle $h'$. The slide or other moving part of the machine (not shown in the drawings) rocks the spindle $h'$, and with it the lever $h$, forcing down the rocking lever K, to which the releasing-lever is pivoted on a stud $k$. On the side of the releasing-lever E is formed a projection $e$, and to the frame is fitted a fixed stud $e'$. As the pawl E is drawn back the projection $e$ slides over the stud $e'$, raising it and causing it to disengage from the locking or dividing lever C, letting the latter drop back onto the periphery of the notched disk B.

Instead of the connecting-rod H the rocking lever K may be drawn back by a chain H' and moved forward again by a spring $H^2$, as in Fig. 7.

The operation of the automatic clutch dividing mechanism is as follows: The dividing or notched disk B being held or locked by the dividing-lever C engaging in the notch $b$, the rocking lever K is oscillated back by the connecting-rod H or chain H', and the releasing-lever E is drawn back thereby. The dividing-lever C is pulled out of the notch $b$ in the disk B, and the finger or stop $c^4$, attached thereto, is moved clear of the second lever $g^2$ on the forked clutch-lever G, thereby permitting the spring $f^2$ to force the driven part F' of the clutch into gear with the driving part F, causing the shaft A and the dividing-disk to rotate. The further movement of the rocking lever K and releasing-lever E causes the latter to ride up the stud $e'$ and release the dividing or locking lever C, which drops back onto the periphery of the dividing-disk B. When the shaft A has made one complete revolution, the cam $g'$ on the sliding clutch F' meets the lever G', rotating the spindle $g$ and oscillating the forked lever G, thereby forcing the two parts F F' of the clutch out of gear. The dividing-disk B is so adjusted on the shaft A in relation to the cam $g'$ on the clutch F' that immediately the cam has thrown the clutches out of gear the dividing-lever C drops into the notch $b$ in the disk B and locks the shaft A in position until the dividing-lever is again drawn back. At the same time the lever or finger $c^4$ drops in front of the second lever $g^2$ on the forked lever G and holds the clutch F' out of contact with the clutch part F until the driving or locking lever C is again raised.

What we claim as our invention, and desire to secure by Letters Patent, is—

1. In dividing mechanism for gear-cutting, milling and other machines, the combination with a shaft A, of a notched disk fixed to the shaft, a clutch with driving member loose on the shaft and driven member sliding over a key thereon, a pivoted dividing-lever engaging the notch in the disk to lock it during the operation of cutting, means for withdrawing the lever and means for rotating the driving clutch member.

2. In dividing mechanism for gear-cutting, milling and other machines, the combination with the shaft to be rotated and a clutch on the shaft, one member loose and the other splined thereto, and means for driving the loose clutch, of a notched disk made fast to the shaft, a dividing-lever engaging the notch in the disk to lock it, and means for withdrawing the lever, substantially as described.

3. In dividing mechanism for gear-cutting, milling and other machines the combination with the frame of the machine and the shaft to be rotated of a clutch with driving member F loose on the shaft, means for driving the same, a sliding member F', splined on the shaft, means for moving it to and fro, a notched disk B attached to the shaft provided with notch $b$ in its periphery, a dividing-pawl C pivoted to the frame to lock the notched disk after each revolution, a releasing-pawl E pivoted to the rocking lever to withdraw the lever C, a rocking lever K pivoted to the frame and actuating-rod H connected to the rocking lever to operate the releasing-pawl E substantially as described.

4. In dividing mechanism for gear-cutting, milling and other machines, the combination with the shaft to be rotated of a clutch with driving member F loose on the shaft, means for driving same, a driven member F' splined to the shaft, a spring to force the clutch members into gear, a forked lever G with arm G', to throw the clutch members out of gear, a cam $g'$ on the clutch-boss to operate the forked lever G at the completion of a revolution of the shaft A, substantially as described.

5. In dividing mechanism for gear-cutting, milling and other machines the combination with the shaft A to be rotated periodically, the driving clutch member F loose thereon and the driven clutch member F' sliding over a key on the shaft of the notched disk B provided with a notch $b$ in its periphery attached to the shaft, a locking-lever C pivoted to the frame engaging therewith, means for withdrawing the lever after each operation of the machine, a spring to force the clutch members F F' into contact, a forked lever G to disengage them, an arm G' attached to the forked lever, a cam $g'$ on the boss of the clutch to engage the arm G' and operate the forked lever G at each revolution of the shaft, there being a projection attached to the forked lever and a finger $c^4$ attached to the locking-lever to hold the clutch member out of engagement, during the operation of the cutting-machine, substantially as described.

In witness whereof we have hereunto signed our names, in the presence of two subscribing witnesses, this 29th day of July, 1902.

T. FLETCHER ROBINSON.
    CHAS. E. SMETHURST.
    WALLACE M. GILBERT.

Witnesses:
    J. OWDEN O'BRIEN,
    B. TATHAM WOODHEAD.